United States Patent [19]

Nishimura et al.

[11] 4,264,961
[45] Apr. 28, 1981

[54] AIR FLOW RATE MEASURING APPARATUS

[75] Inventors: Yutaka Nishimura; Yoshishige Oyama, both of Katsuta, Japan

[73] Assignee: Hitachi, Ltd., Tokyo, Japan

[21] Appl. No.: 42,301

[22] Filed: May 25, 1979

[30] Foreign Application Priority Data

Jun. 2, 1978 [JP] Japan .................... 53-65748

[51] Int. Cl.³ ............................ G01F 25/00
[52] U.S. Cl. ............................ 364/510; 364/571;
   73/3; 73/204; 123/494
[58] Field of Search ............. 364/509, 510, 551, 571,
   364/496, 497; 73/3, 195, 204; 123/32 EA

[56] References Cited

U.S. PATENT DOCUMENTS

| 3,796,198 | 3/1974 | Mauch et al. | 123/32 EA |
| 3,924,445 | 12/1975 | Konomi et al. | 73/3 |
| 3,969,614 | 7/1976 | Moyer et al. | 123/32 EA |
| 4,121,545 | 10/1978 | Mizote | 123/32 EA |
| 4,125,093 | 11/1978 | Platzer, Jr. | 123/32 EA |
| 4,138,725 | 2/1979 | Ikemoto et al. | 364/510 |
| 4,166,437 | 9/1979 | Bianchi et al. | 123/32 EA |

Primary Examiner—Charles E. Atkinson
Assistant Examiner—Gary Chin
Attorney, Agent, or Firm—Craig and Antonelli

[57] ABSTRACT

An apparatus for measuring the flow rate of suction air in an internal combustion engine in which the heat radiation characteristic of a heat generator disposed in the suction air passage, which characteristic varies with the lapse of time due to dust and like foreign matters depositing on the heat generator, is calibrated on the basis of the air flow rate value measured by an air flow rate measuring device of differential pressure type so as to insure accurate measurement of the suction air flow rate.

12 Claims, 15 Drawing Figures

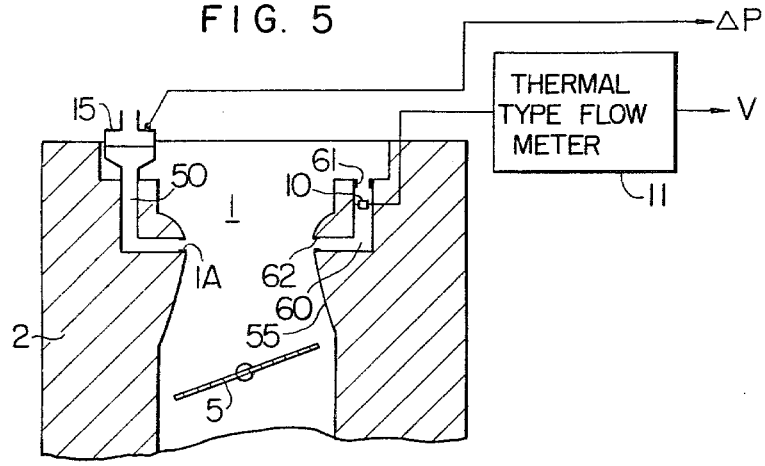
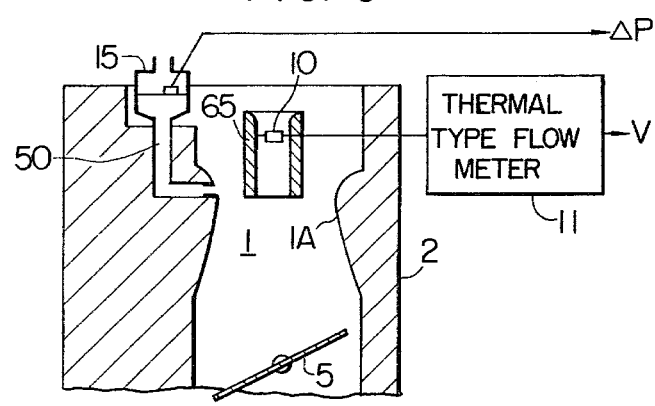
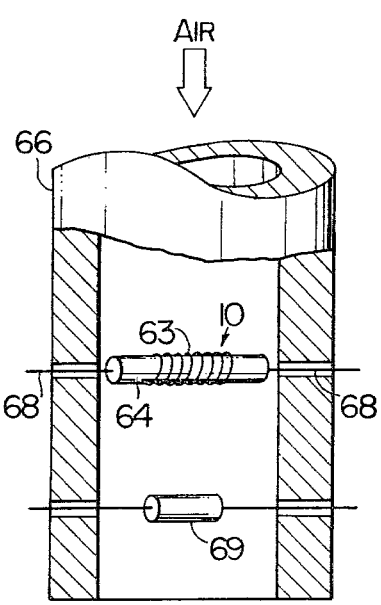

AIR FLOW RATE MEASURING APPARATUS

This invention relates to an apparatus for measuring the flow rate of suction air in an internal combustion engine for automotive vehicles.

U.S. Pat. No. 3,796,198 discloses a thermal sensor type air flow meter as a means for measuring the flow rate of suction air in an internal combustion engine for automotive vehicles. In this U.S. Patent, an electrical heat generator such a hot wire is disposed in the path of suction air, and the flow rate of suction air is calculated on the basis of the quantity of heat radiated from the heat generator, which quantity is variable depending on the air flow rate, so as to utilize it for the control of the amount of fuel injected into the internal combustion engine.

A differential pressure type air flow meter is disclosed in U.S. Pat. No. 3,969,614 and is commonly known. In the differential pressure type air flow meter dissolved in this U.S. Patent, the negative pressure difference variable depending on the variation in the flow rate of suction air flowing through the portion of the intake manifold downstream of the throttle valve is sensed to measure the suction air flow rate which is utilized for the control of the amount of fuel injected into the internal combustion engine.

The prior art flow meter of the differential pressure type has been defective in that it cannot measure the air flow rate with sufficiently high accuracy in a small flow rate range although it is substantially free from a secular variation and the accuracy of measurement is not substantially affected by the secular variation. Also, the prior art air flow meter of the thermal type has been defective in that the accuracy of air flow rate measurement tends to be degraded due to a secular variation. More precisely, dust and like foreign matters entrained on the stream of air deposit with the lapse of time on the heat generator such as the hot wire disposed in the stream of air thereby deteriorating the heat radiation characteristic of the heat generator. In other words, the variation in the effective surface area of the hot wire and the corresponding variation in the quantity of heat radiated from the hot wire result inevitably in the degradation of the accuracy of measurement by the air flow meter of this type.

It is therefore an object of the present invention to provide an air flow meter in which a secular variation of the conventional thermal type air flow meter is compensated.

According to the present invention, the air flow rate value measured by the differential pressure type air flow meter and the output of a thermal type air flow meter are correlated to calibrate the coefficient of secular variation of the thermal type air flow meter, and this calibrated coefficient is used so that the output of the thermal type air flow meter can provide the actual air flow rate with high accuracy of measurement.

In accordance with one aspect of the present invention, there is provided an air flow rate measuring apparatus for an internal combustion engine comprising in combination: differential pressure type air flow rate measuring means including a pressure sensor sensing the differential pressure varying depending on the variation in the flow rate of suction air flowing through the main venturi of the engine and means for measuring the suction air flow rate on the basis of the output of the pressure sensor; means including electrical heat-generating means located in the stream of suction air for sensing the quantity of heat radiated into the stream of air from the heat-generating means and generating an output signal indicative of the radiated quantity of heat; thermal type air flow rate measuring means for measuring the suction air flow rate by arithmetic calculation according to a predetermined algebraic function which includes the value of the output of the sensing means and a coefficient varying with the lapse of time; means for calibrating the coefficient in the algebraic function on the basis of the value of the output of the differential pressure type air flow rate measuring means and the value of the output of the sensing means; and means for arithmetically calculating the suction air flow rate according to the algebraic function in which the value of the coefficient calibrated by the calibrating means is introduced to be calculated together with the value of the output of the sensing means.

In accordance with another aspect of the present invention, there is provided an air flow rate measuring apparatus for an internal combustion engine comprising in combination; differential pressure type air flow rate measuring means including a pressure sensor sensing the differential pressure across two spaced predetermined points, varying depending on the variation in the flow rate of suction air flowing through the main venturi of the engine and means for measuring the suction air flow rate on the basis of the value of the output of the pressure sensor according to a first predetermined algebraic function; supporting means for supporting an electrical heat generator within a predetermined air passage; means including the electrical heat generator for electrically sensing the quantity of heat radiated into the stream of air from the heat generator and generating an output signal indicative of the radiated quantity of heat; thermal type air flow rate measuring means for measuring the suction air flow rate by arithmetic calculation according to a second predetermined algebraic function which includes the value of the output of the sensing means and a coefficient varying with the lapse of time; means for calibrating the coefficient in the second algebraic function on the basis of the value of the output of the differential pressure type air flow rate measuring means and the value of the output of the sensing means; and means for arithmetically calculating the suction air flow rate according to the second algebraic function in which the value of the coefficient calibrated by the calibrating means is introduced to be calculated together with the value of the output of the sensing means.

The above and other objects, features and advantages of the present invention will be more clear from the following detailed description with reference to the accompanying drawings, in which:

FIGS. 5 and 6 are schematic sectional views showing other arrangements of the pressure sensor in the differential pressure type air flow meter and the heat generator in the thermal type air flow meter shown in FIG. 1;

FIG. 7 is a schematic partial sectional view showing an arrangement of another form of the heat generator preferably employed in the present invention;

Figure 1:
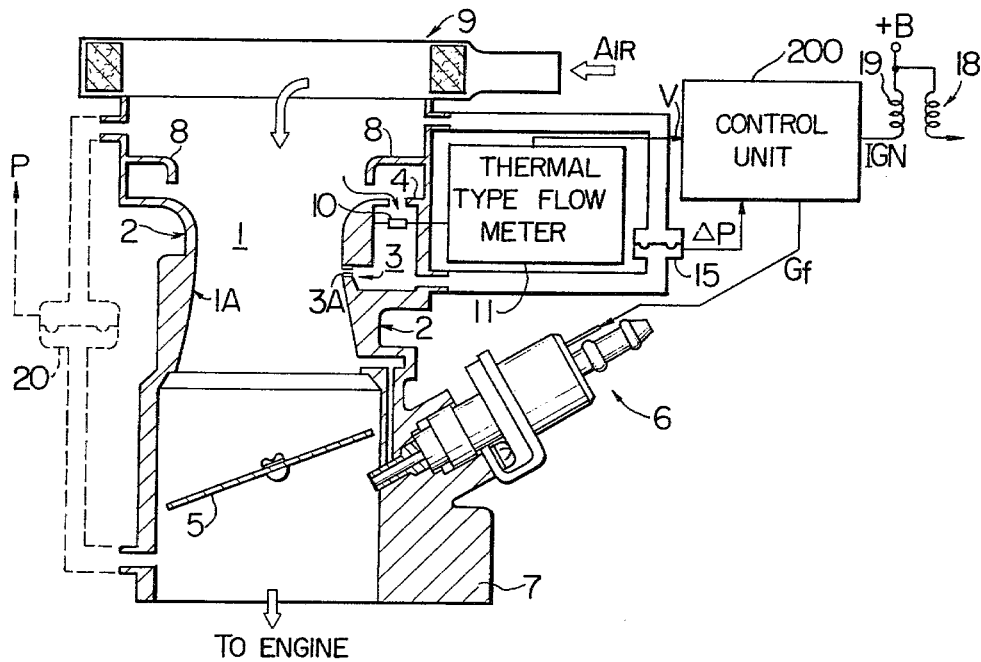
FIG. 1 is a schematic sectional view of an embodiment of the air flow rate measuring apparatus according to the present invention.

Referring now to FIG. 1 showing a preferred embodiment of the air flow rate measuring apparatus according to the present invention, a main venturi 1 is defined by a venturi chamber body 2 of metal to form a suction air passage extending into an internal combustion engine. A bypass passage 3 is formed in a portion of the body 2, and a portion of suction air passing through the main venturi 1 passes through this bypass passage 3 in a direction as shown by the arrow. An orifice 4 is provided at the inlet of the bypass passage 3, and another orifice 3A is formed at the outlet of the bypass passage 3. These orifices 4 and 3A determine the ratio between the amount of air flowing through the main venturi 1 and the amount of air flowing through the bypass passage 3, that is, the flow division ratio. The outlet port of the bypass passage 3 is located in the narrowest area 1A of the main venturi 1. A known throttle valve 5 is disposed in a position downstream of the narrowest area 1A of the main venturi 1, and a fuel injector 6 for injecting fuel is mounted in a throttle chamber 7. A cover 8 is provided adjacent to the inlet opening of the main venturi 1 so that dust and like foreign matters may not enter the bypass passage 3, and an air filter 9 is disposed on the upstream side of the main venturi 1.

A heat generator 10 is disposed in the bypass passage 3 and is connected to a thermal type air flow meter 11 which generates an output voltage signal V indicative of the suction air flow rate and applies this output signal V to a control unit 200. A differential pressure transducer or differential pressure sensor 15 is provided to electrically sense the difference between the pressure of air at a position downstream of the air cleaner 9, that is, at the inlet area of the main venturi 1 and the pressure of air at the narrowest area 1A of the main venturi 1 to generate an output signal ΔP indicative of the sensed differential pressure. Such a sensor 15 is well known per se. This signal ΔP is also applied to the control unit 200. In lieu of this differential pressure sensor 15, a differential pressure sensor 20 as shown by the dotted lines in FIG. 1 may be used. This alternative sensor 20 senses the difference P between the pressure of air at the inlet area of the main venturi 1 and that at a point downstream of the throttle valve 5.

Figure 2:
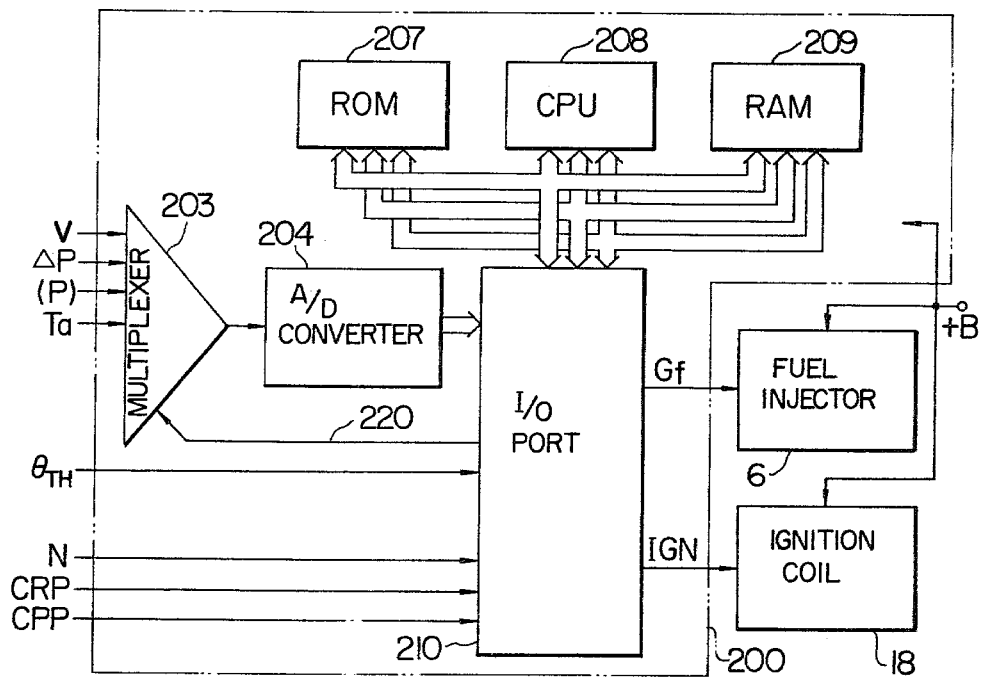
FIG. 2 is a block circuit diagram of one form of the control unit shown in FIG. 1.

FIG. 2 shows the structure of one form of the control unit 200 shown in FIG. 1. Signals applied to this control unit 200 are broadly classified into three groups. The first group includes analog signals such as the output signal V of the thermal type air flow meter 11, the output signal ΔP of the differential pressure sensor 15, the output signal P of the alternative differential pressure sensor 20, and a signal $T_a$ indicative of the air temperature. The second group includes signals representing a high level or a low level, that is, on-off state signals such as a signal $\theta TH$ indicative of whether the throttle valve 5 is in its full closed position or not. The signal $\theta TH$ appears from a switch (not shown) arranged for interlocking operation with the throttle valve 5. This signal $\theta TH$ may be a one-bit digital signal. The third group includes pulse train signals such as a pulse signal N indicative of the rotation speed of the engine, a reference crank angle signal CRP and a crank position pulse signal CPP. Such signals are derived from a known crank angle sensor (not shown). Each pulse of the signal CRP appears at a crank angle of 180°, 120° and 90° when the number of cylinders of the engine is four, six and eight respectively. Each pulse of the signal CPP appears every 0.5° of the crank angle.

A CPU 208 included in the control unit 200 is a central processing unit carrying out arithmetic processing of digital data. A ROM 207 is a read-only memory element storing control programs and fixed data, and a RAM 209 is a readable and writable memory element.

The CPU 208 applies a multiplexer control signal to an I/O port 210 by way of a bus, and this signal is applied from the I/O port 210 to a multiplexer 203 by way of a control line 220 so that an A/D converter 204 receives the signal, for example, the output signal V of the thermal type air flow meter 11 through the multiplexer 203. The output signal of the A/D converter 204 is applied to the I/O port 210 together with the switch output signal $\theta TH$, the crank angle signal CRP and the crank position pulse signal CPP to be applied to the CPU 208 by way of bases. After the arithmetic processing, the CPU 208 applies control signals $G_f$ and IGN through the I/O port 210 to the fuel injector 6 and to an ignition coil 18 respectively. The values V, ΔP and $T_a$ outputted from the A/D converter 204 as digital signals are stored in the RAM 209 until they are read out by the step 301 of FIG. 3. It is apparent that a power supply voltage is applied from a power supply terminal +B to the individual circuits and elements constituting the control unit 200 although the terminal +B is merely shown in FIG. 2. Further, a valve electro-magnetic coil and an electro-magnetic energy auumulating primary-coil 19 as shown in FIG. 1 are provided for each of the fuel injector 6 and ignition coil 18. These coils are connected at one end thereof to the power supply terminal +B and at the other end hereof to the I/O port 210 so that the current supplied to the fuel injector 6 and ignition coil 18 can be controlled by the control signals $G_f$ and IGN respectively.

There is the following relation between the output signal V of the thermal type air flow meter 11 and the mass flow rate G of engine suction air:

$$V^2 = (A + B \sqrt{G}) \times (T_w - T_a) \times S \tag{1}$$

where $T_w$ is the temperature of the heat generator, that is, the hot wire, $T_a$ is the temperature of suction air, S is the effective surface area of the hot wire, and A and B are constants. The secular variation in the heat radiation characteristics of the hot wire 10 in the thermal type air flow meter 11 includes a variation in the effective surface area S of the hot wire due to deposit of dust and like foreign matters on the sensor surface. Further, a variation occurs in the value of $T_w$ due to the secular variation of the resistance value of the hot wire 10. The equation (1) may be expressed as follows:

$$V^2 = K \times (A + B \sqrt{G}) \qquad (2)$$

where $K = (T_w - T_a) \times S$. According to the equation (2), K is a single constant or coefficient which varies in relation to the elapse of time, that is, the coefficient which represents the degree of secular variation. Therefore, when the value of K is suitably compensated or calibrated, it is possible to solve the problem of the secular variation of the output V of the thermal type air flow meter 11. In the mass production of such thermal type air flow meters 11, the effective surface area S of the hot wire 10 and the temperature $T_w$ of the hot wire 10 in the equation (1) are the factors which cause fluctuations of the air flow meter output V. Therefore, the fluctuations of the output V of mass-produced thermal type air flow meters 11 can be obviated by compensating or calibrating the value of K in the equation (2) for each of the mass-produced air flow meters of this type. This coefficient K will be referred to hereinafter as a calibration coefficient.

Figure 9:
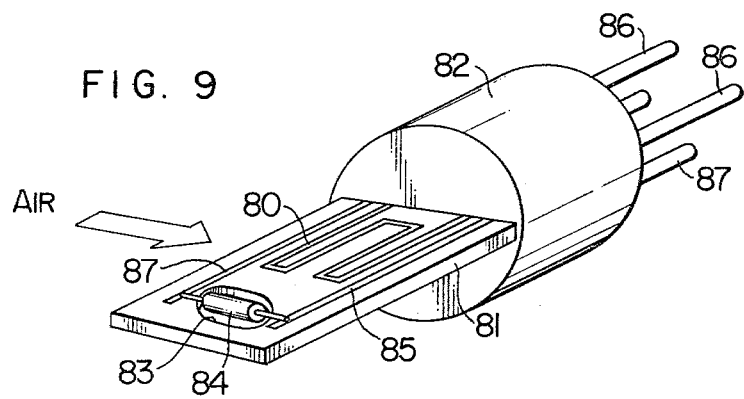
FIG. 9 is a schematic perspective view showing another form of the means for supporting the heat generator and air temperature sensor.
Figure 10:
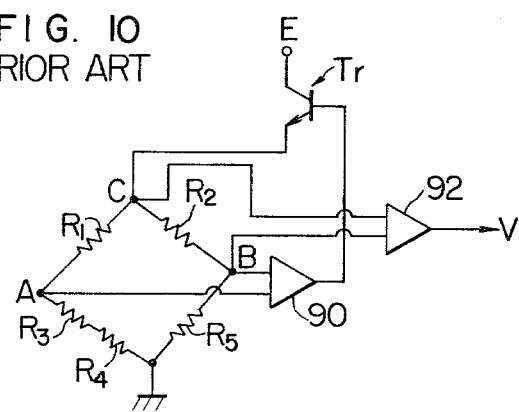
FIG. 10 is a schematic circuit diagram of a known thermal type air flow meter.

On the other hand, there is the following relation between the output $\Delta P$ of the differential pressure sensor 15 shown in FIG. 1 and the mas flow rate G of engine suction air:

$$G = CA_s \sqrt{2g \gamma \Delta P} \qquad (3)$$

where C is the flow rate coefficient, $A_s$ is the sectional area of the air passage, $\Delta P$ is the differential pressure across the main venturi, g is the acceleration of gravity, and $\gamma$ is the specific weight of ambient air. The values of C, $A_s$ and g in the equation (3) can be considered to be substantially constant, and they will be generally designated by a single constant D in a flow chart described later. The value of the mass flow rate G of engine suction air can therefore be arithmetically calculated on the basis of the value of the specific weight $\gamma$ of ambient air and the value of the venturi differential pressure $\Delta P$. Further, due to the fact that the specific weight $\gamma$ of ambient air is substantially the function of the temperature of ambient air, an air temperature sensor 69 as shown in FIG. 7 described later or 84 as shown in FIG. 9 described later or $R_4$ as shown in FIG. 10 described later may be provided to find the value of the specific weight $\gamma$ of air.

The method of arithmetically calculating the air flow rate G by introducing the value of the output $\Delta P$ of the differential pressure sensor 15 shown in FIG. 1 into the equation (3) will be described presently. It is well known that the accuracy of measurement is higher when the air flow rate G is larger. The value of the output $\Delta P$ of the differential pressure sensor 15 shown in FIG. 1 and the value of the specific weight $\gamma$ of air (the air temperature) are found to arithmetically calculate the value of the mass flow rate G according to the equation (3), when the value of $\Delta P$ is larger than a predetermined reference value $(\Delta P)_o$. The value of G thus obtained and the value of the output V of the thermal type air flow meter 11 are then introduced into the equation (2) to find the value of the calibration coefficient K. Thereafter, the air flow rate G is arithmetically calculated according to the equation (2) on the basis of this renewed calibration coefficient K and the value of the output V of the thermal type air flow meter 11, and then, the required amount of fuel $G_f$ is arithmetically calculated according to known means.

The operation of the control unit 200 carrying out such a manner of arithmetic processing will now be described using flow charts shown in FIGS. 3 and 4. The flow of the steps in the flow charts is started by the predetermined change of the engine's conditions and by the lapse of a predetermined interval of time. This flow may be excuted, for example, each one minute as a background job of a computer.

The control unit 200 including the CPU 208, the ROM 207, RAM 209, the multiplexer 203, the A/D converter 204 and I/O port is normally operated as a fourground job of a computer, for executing the fuel and the ignition controls which are more important for the control of the engine than the above-mentioned background job. Therefore the flow chart as shown in FIG. 3 may be executed each predetermined time interval.

Figure 3:
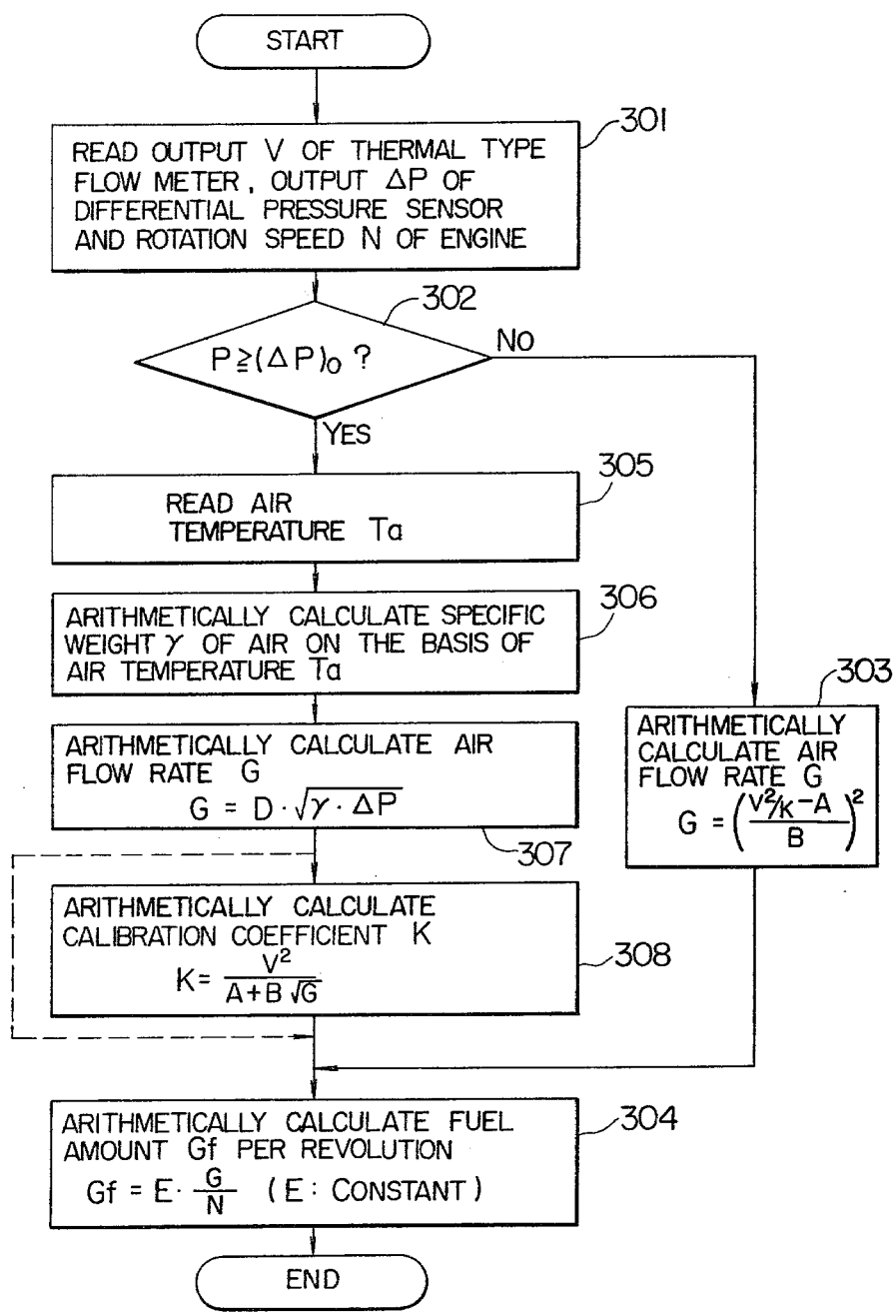
FIGS. 3 and 4 are flow charts showing successive steps for the arithmetic calculation of the amount of fuel $G_f$ in the control unit in the air flow rate measuring apparatus according to the present invention.
Figure 4:
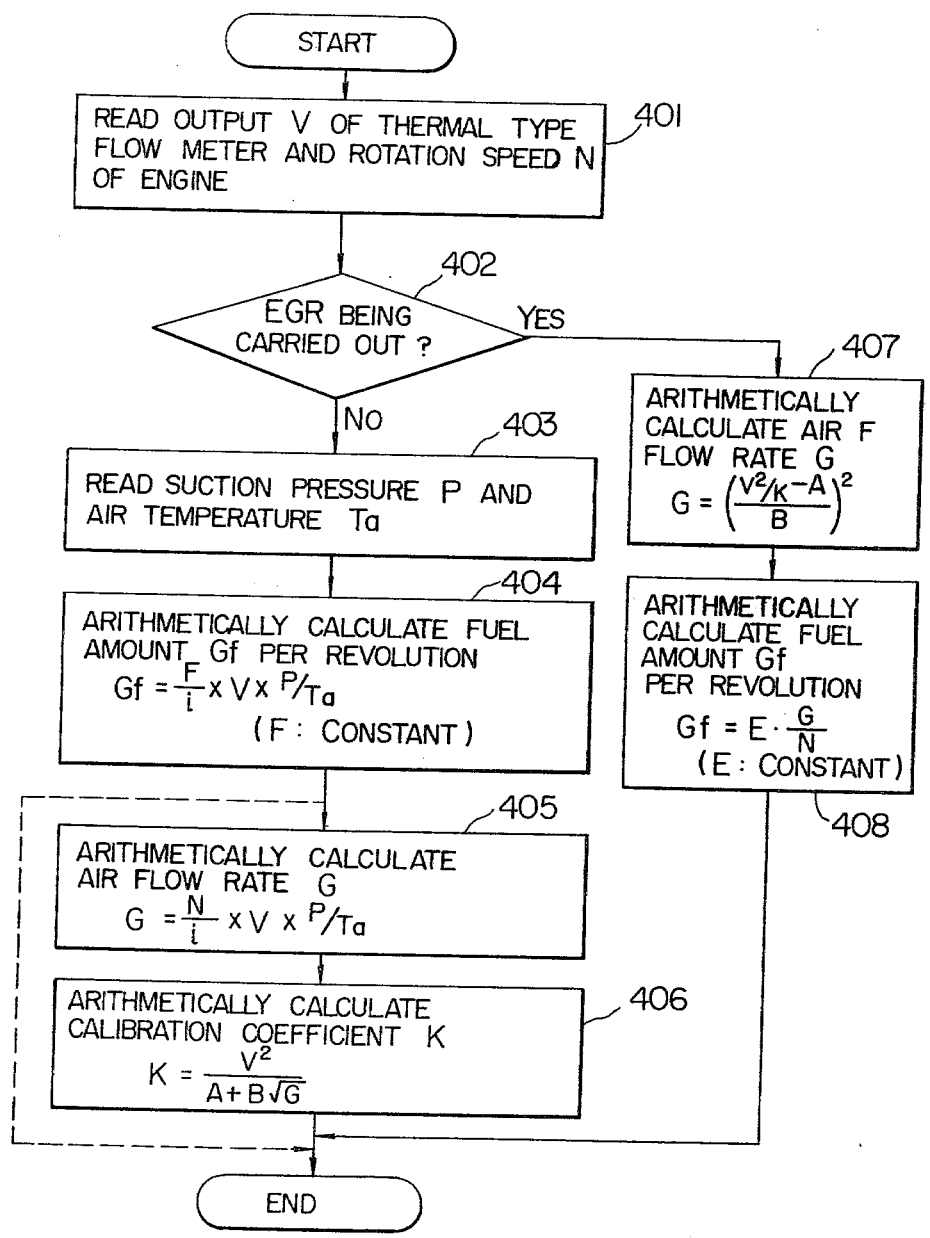

In step 301 in FIG. 3, the output V of the thermal type air flow meter 11 and the output $\Delta P$ of the differential pressure sensor 15 which are stored in the RAM 209 as digital signals are read out from the RAM 209 under control of the control unit 200 together with the signal N indicatine of the rotation speed of the engine. In step 302, the predetermined reference value $(\Delta P)_o$ stored in the ROM 207 is read out to the CPU 208 from the ROM 207 by way of a bus under control of a command signal applied from the CPU 208, and this value $(\Delta P)_o$ is compared with the value of the signal $\Delta P$ in the CPU 208. When the result of comparison proves that the value of $\Delta P$ is larger than the predetermined reference value $(\Delta P)_o$, the A/D converted equivalent of the signal $T_a$ indicative of the air temperature is read out to the CPU 208 from the RAM 209 by way of a bus under control of a command signal applied from the CPU 208 in step 305. In step 306, the CPU 208 arithmetically calculates the specific weight $\gamma$ of air according to a predetermined calculation formula on the basis of the read-out digital data of the air temperature signal $T_a$. In step 307, the value of $\gamma$ arithmetically calculated in step 306 and the read-out value of the differential pressure signal $\Delta P$ are used to arithmetically calculate the air flow rate G according to the equation (3). In step 308, the value of G arithmetically calculated in step 307 and the already read-out value of V are used to arithmetically calculate the calibration coefficient K according to the equation (2) under control of the CPU 208. This arithmetic calculation of the coefficient K may not be continuously carried out but may be carried out at predetermined time intervals. Thus, this step 308 may be omitted as shown by the dotted line in FIG. 3. The value of K obtained as the result of arithmetic calculation in step 308 is stored in, for example, the RAM 209 to be read out therefrom when it is required in step 303 described later. In step 304, fuel $G_f$ required for each revolution of the engine is arithmetically calculated by using flow rate G, where the flow rate G is, as stated above, obtained on the basis of the formula (2) by using the output V from the thermal type air flow meter and the calibration coefficient K which is already calibrated by the step 308. The letter E in the calculation formula shown in step 304 is a constant.

When, on the other hand, the value of $\Delta P$ is smaller than the predetermined reference value $(\Delta P)_o$ or $\Delta P < (\Delta P)_o$, that is, when the air flow rate G is in its small flow rate range. In such a case, the output V of the thermal type air flow meter 11 is used to arithmetically calculate the air flow rate G according to the equation (2), and this calculated value of G is used for the control of the amount of fuel $G_f$. It should be noted that, in the arithmetic calculation according to the equation (2), the calibration coefficient K arithmetically calculated previously in step 308 is used as the value of K which is subject to the secular variation. Therefore, the output V of the thermal type air flow meter 11 tending to include an error due to deposits of dust and like foreign matters on the heat generator or hot wire 10 can be compensated or corrected when the coefficient K calibrated in step 308 is used in the arithmetic calculation.

When the relation $\Delta P < (\Delta P)_o$ holds, that is, when the relation $\Delta P \geq (\Delta P)_o$ does not hold, this is identified in step 302 in the flow chart of FIG. 3. In this case, the value of V and the value of K arithmetically calculated already in step 308 and stored in the RAM 209 are read out under control of the CPU 208 to be used for the arithmetic calculation of the air flow rate G in step 303 according to the equation (2) programmed already in the ROM 207. On the basis of these values of V and K, the amount of fuel $G_f$ is arithmetically calculated in step 304.

The aforementioned flow chart of FIG. 3 refers to the case in which the difference between the air pressure at the inlet area of the main venturi 1 and that at the narrowest area 1A of the main venturi 1 is sensed by the differential pressure sensor 15. FIG. 4 is a flow chart showing successive steps when the alternative differential pressure sensor 20 shown in FIG. 1 is used to sense the difference between the air pressure at the inlet area of the main venturi 1 and that at the point downstream of the throttle valve 5.

In such a mode of air pressure measurement, the differential pressure sensor 20 is unable to accurately and exclusively measure the air flow rate G when the so-called exhaust gas recycle (EGR) is carried out, since the sum of the amount of suction air and the amount of recycled exhaust gases flows through the main venturi 1 toward the engine. Thus, in the engine operating condition in which the EGR is not carried out, it is effective to measure the differential pressure of suction air and to arithmetically calculate the flow rate G of suction air according to an equation (4) described presently, while in the engine operating condition in which the EGR is being carried out, it is effective to arithmetically calculate the air flow rate G on the basis of the value of the output V of the thermal type air flow meter 11. Further, it is effective, for the compensation of the secular variation of the hot wire 10 in the thermal sensor type air flow meter 11, to arithmetically calculate the air flow rate G on the basis of the value of the sensed differential pressure P and the value of the engine rotation speed N and to calibrate the coefficient K of the thermal type air flow meter 11 on the basis of the arithmetically calculated value of the air flow rate G, as described already with reference to FIG. 3.

There is the following relation between the output P of the differential pressure sensor 20 and the flow rate G of engine suction air:

$$G = (N/i) \times V_e \times P/T_a \quad (4)$$

where N is the rotation speed of the engine in γpm, i is a constant determined by the number of engine cylinders and determined also depending on whether the engine is of the two-stroke cycle type or the four-stroke cycle type (which constant is, for example, i=2 when the engine is of the four-cylinder four-stroke cycle type), $V_e$ is the volume of engine exhaust gases, P is the pressure (suction air pressure) at the point downstream of the throttle valve 5, and $T_a$ is the absolute temperature of suction air.

The operation of the control unit 200 carrying out such a manner of arithmetic processing will now be described with reference to a flow chart of FIG. 4.

In step 401, the output V of the thermal type Air flow meter 11 is applied to the control unit 200 together with the signal indicative of the engine rotation speed N, as described hereinbefore with reference to FIG. 3. In step 402, the CPU 208 identifies that the EGR is now being done or not. It can be discriminated not by signals from other sensor but by flags set in the RAM whether the EGR is being carried out. When the result of identification in step 402 proves that the EGR is being carried out, the output P of the differential pressure sensor 20 and the signal indicative of the air temperature $T_a$ are applied to the control unit 200 in step 403. In step 404, the amount of fuel $G_f$ required for each revolution of the engine is arithmetically calculated according to the following equation (5) on the basis of the values of V, P and $T_a$:

$$G_f = (N/i) \times V \times P/T_a \quad (5)$$

where F is a constant.

Thus, in the engine operation mode in which the EGR is not carried out, the value of $G_f$ arithmetically calculated in step 404 is used as the controlled amount of fuel. In step 405, the air flow rate G is arithmetically calculated according to the equation (4), and in step 406, the value of G thus obtained and the read-out value of V are used to arithmetically calculate the value of the calibration coefficient K. This arithmetic calculation of K need not be continuously carried out and may be done at suitable time internnals as described already. The dotted line represents such a case. The arithmetically calculated value of the calibration coefficient K is stored in the RAM 209, as also described already.

When, on the other hand, the EGR is being carried out, the output V of the thermal type air flow meter 11 is used to determine the amount of fuel $G_f$. It is to be noted that the value of the output V of the thermal type air flow meter 11 is now free from the error resulting from the deposit of dust and like foreign matters on the hot wire 10, since the secular variation in the heat radiation characteristic of the heat generator or hot wire 10 due to deposited foreign matters is compensated by the coefficient K calibrated already in step 406. Thus, in the engine operation mode with the EGR, the calibration coefficient K and the output value V of the thermal type air flow meter 11 are used to arithmetically calculate the air flow rate G in step 407. Then, in step 408, the value of G obtained in step 407 is used to arithmetically calculate the amount of fuel $G_f$ according to the calculation formula used in step 304 shown in FIG. 3. The signal representing the arithmetically calculated value of $G_f$ is used to control the fuel injector 6.

FIGS. 5 and 6 show other arrangements of the pressure sensor in the differential pressure type air flow meter and the heat generator in the thermal type air flow meter. The arrangement shown in FIG. 5 differs from that shown in FIG. 1 in that the hot wire 10 is disposed in a bypass passage 60 formed in the main venturi chamber body 2, and another passage 50 is formed in the body 2 at a position substantially diametrically opposite to the bypass passage 60 to be connected to the differential pressure sensor 15. Orifices 61 and 62 provided at the inlet and outlet respectively of the bypass passage 60 act to set a predetermined constant ratio (the flow division ratio) between the amount of air flowing through the main venturi 1 and that flowing through the bypass passage 60. The orifice 62 is located in the narrowest area 1A of the main venturi 1. The outlet of the passage 50 is also located in this narrowest area 1A of the main venturi 1.

The arrangement shown in FIG. 6 differs from that shown in FIG. 5 in the position of the heat generator or hot wire 10 only. In FIG. 6, the hot wire 10 is disposed within a cylindrical auxiliary venturi 65 disposed within the main venturi 1 in coaxial relation therewith. In the arrangement shown in FIG. 6 too, the ratio between the amount of air flowing through the main venturi 1 and that flowing through the auxiliary venturi 65 is set at a predetermined constant value. In the arrangement shown in FIG. 6, the amount of air flowing through the auxiliary venturi 65 is larger than that flowing through the bypass passages 3 and 60 in FIGS. 1 and 5 and is thus less adversely affected by the friction with the wall surface of the air passage. Therefore, the arrangement shown in FIG. 6 is advantageous in that the air flow ratio or flow division ratio is highly accurate.

Figure 8:
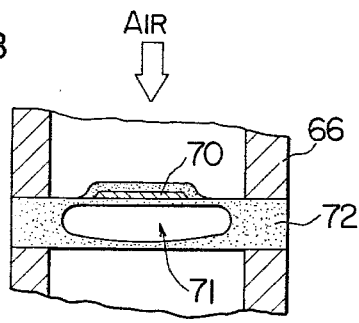
FIG. 8 is a schematic sectional view showing another form of the means for supporting the heat generator.

FIGS. 7 to 9 show arrangements of other forms of the heat generator and structures of the heat generator supporting means preferably employed in the present invention.

FIG. 7 shows an arragnement of the heat generator 10 and an associated air temperature sensing member disposed within the air passage. This air passage is defined by a hollow cylindrical member 66 in FIG. 7 although it may be provided by the auxiliary venturi 65 shown in FIG. 6 or by the auxiliary passage 60 shown in FIG. 5. The heat generator 10 comprises a plurality of turns of a fine wire 63 of heat-generating resistive material such as platinum wound around the outer surface of a cylindrical support 64 of thermal insulating material such as a ceramic, and the fine wire 63 is electrically connected at its ends to a pair of lead wires 68. Such a heat generator 10 is commonly known. In lieu of the platinum wire, a fine wire of tungsten or a film-like heat generator may be used. A temperature sensing member 69 such as a thermistor is disposed beneath the heat generator 10 to sense the temperature of air. As described in detail later, such a heat generator 10 and such an air temperature sensing member 69 may constitute two arms of a resistance bridge circuit so that the temperature of air can be compensated by the output of the thermal type air flow meter.

In the arrangement shown in FIG. 7, a portion of heat generated from the heat generator 10 by the flow of current supplied thereto escapes toward the cylindrical member 66 by way of the metal wire support 64 and the lead wires 68. Also, another portion of heat generated from the heat generator 10 escapes toward the cylindrical member 66 by radiation. The escapement of heat is desirably as little as possible since it adversely affects the output value of the thermal sensor type air flow meter. It is therefore desirable that the support 64 and the lead wires 68 have a smallest possible diameter, so that losses of heat due to radiation can be prevented as far as possible. In the embodiment shown in FIG. 7, the heat generator 10 is present in a turbulence-free stream of air due to the fact that the heat generator 10 is disposed on the upstream side of the air temperature sensing member 69. This ensures full radiation of heat.

FIG. 8 shows another form of the member supporting the heat generator. Referring to FIG. 8, a heat-generating resistive element 70 is supported by a supporting member 72 having a cavity 71 thereinside. This supporting member 72 may be made of a ceramic material or glass. The resistive element 70 is covered at is surface with a material similar to that of the supporting member 72 so that it can be protected against variations in the environmental conditions. The supporting member 72 of such a structure ensures an excellent response to radiated heat due to the fact that the presence of the internal cavity 71 reduces the thermal capacity of the supporting member 72.

FIG. 9 shows still another form of the supporting means supporting the heat generator and the air temperature sensing member. Referring to FIG. 9, a heat-generating resistive element 80 is provided on a flat supporting base 81. Preferably, this heat-generating resistive element 80 is formed by coating a paste consisting essentially of powdery platinum or silver on the supporting base 81 in a film form and then firing to deposit the film on the base 81. The supporting base 81 is a flat plate of ceramic material or glass and is fixed at one end thereof to one end of a cylindrical heat-insulating supporting member 82 of, for example, a ceramic material or a synthetic resin. A slot 83 is formed adjacent to the other end of the supporting base 81, and an air temperature sensing member 84 such as a thermistor is partly received in this slot 83. The air temperature sensing member 84 is connected at its ends to electrode lead wires 85 which are connected to a pair of terminals 86 provided on the other end face of the supporting member 82. Similarly, the ends of the resistive element 80 are connected to another pair of terminals 87. Such a resistive element 80 may be placed within the air passage defined by, for example, the cylinder 66 shown in FIG. 7. In such a base, a hole (not shown) permitting insertion of the supporting member 82 therethrough is bored in the side wall of the cylinder 66, and the supporting member 82 supporting the resistive element 80 is inserted into the air passage through this hole. The arrow a in FIG. 9 indicates the direction of air flow in such an embodiment.

FIG. 10 shows the electrical structure of a thermal type air flow meter which is commonly known per se and which is applicable also to the present invention. Referring to FIG. 10, a resistor $R_1$ and another resistor $R_5$ which represents a heat-generating resistive element constitute a first pair of opposite arms of a resistance bridge circuit. A resistor $R_2$ and a combination of another resistor $R_3$ and another resistor $R_4$ which represents an air temperature sensor constitute a second pair of opposite arms of the bridge circuit. Suppose now that $R_1 = R_2$, then, the voltage $V_{AB}$ across the points A and B in FIG. 10 is zero when $(R_3 + R_4) = R_5$. The resistance value of the resistor $R_5$ vaires depending on the quantity of heat radiated from the heat-generating resistive element. The voltage $V_{AB}$ varying depending on the variation in the resistance value of the resistor $R_5$ is amplified by an amplifier 90, and the output of the amplifier 90 is applied to the base of a transistor $T_r$. The manner of control is such that the transistor $T_r$ controls the current supplied from a power source E to the bridge circuit until the voltage $V_{AB}$ is reduced to zero. Because of the above manner of control, a variation in the air flow rate giving rise to a corresponding variation in the quantity of radiated heat results in a corresponding variation in the current value flowing through the resistor $R_5$, and the resultant voltage $V_{BC}$ appearing across the points B and C is applied to another amplifier 92 to appear as an output signal V indicative of the air flow rate.

Figure 11:
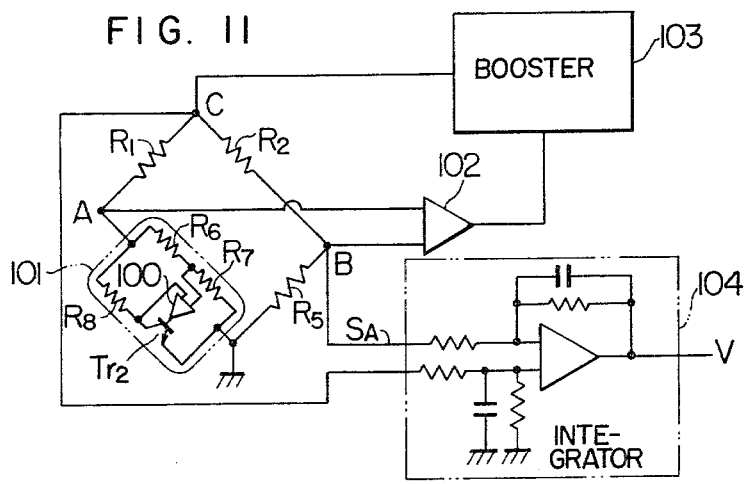
FIG. 11 is a circuit diagram of a thermal type air flow meter preferably employed in the present invention.

FIG. 11 shows the electrical structure of a thermal type air flow meter preferably employed in the apparatus according to the present invention. In FIG. 10, the resistor $R_4$ representing the air temperature sensor must be an element having a high resistance value in order to avoid overheat by the current, when the resistor $R_4$ is incorporated in the bridge circuit shown in FIG. 10. The size of the resistive element becomes inevitably large resulting in a degraded response to heat.

It is therefore desirable that the bridge circuit shown in FIG. 10 is modified to have an electrical structure as shown in FIG. 11 so as to avoid the degraded response to heat. In FIG. 11, a transistor $T_{r2}$ is incorporated in a temperature compensation bridge circuit 101 which replaces the resistors $R_3$ and $R_4$ in FIG. 10. However, it may be replaced by any other suitable element whose resistance value is variable depending on the variation in the voltage or current. An example of such an element is an FET or a thermistor. An amplifier 100 in the temperature compensation bridge circuit 101 functions as a negative feedback means for insuring the balance of the bridge circuit 101 composed of resistors $R_6$, $R_7$, and $R_8$ and the transistor $T_{r2}$, so that the following relation holds:

$$R_7 \cdot R_8 = R_6 \cdot R_{Tr2}$$

Suppose that $R_8 < < R_6$, then the composite resistance of the temperature compensation bridge circuit 101 is given by $$R_8 \left(1 + \frac{R_7}{R_6}\right).$$

Figure 13A:
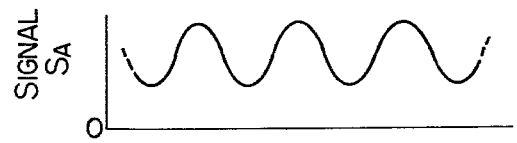
FIGS. 13A, 13B and 13C are graphs showing individual waveforms appearing at various points in the circuit shown in FIG. 12.

It will thus be seen that the resistance value of the resistor $R_8$ becomes equivalently large, and the resistor $R_8$ having the large resistance value acts as a temperature compensation resistor which can operate with a good response characteristic in spite of its small size. As in the resistance bridge circuit shown in FIG. 10, the resistors $R_1$, $R_2$, the temperature compensation bridge 101 and the heat-generating resistor $R_5$ constitute a Wheatstone bridge. A control amplifier 102 similar to the amplifier 90 shown in FIG. 10 amplifies the voltage $V_{AB}$ across the points A and B of the bridge, and a current booster 103 functions in a manner as the transistor $T_r$ shown in FIG. 10. Thus, when the current flowing through the heat-generating resistor $R_5$ is adjusted by the current booster 103 so that the voltage $V_{AB}$ across the points A and B of the bridge becomes zero, the current value at that time corresponds to the value of the suction air flow rate. Therefore, the voltage $V_{BC}$ across the points B and C of the bridge corresponds to the suction air flow rate. Due to the pulsation of the stream of suction air resulting from the reciprocating movement of the piston, the velocity of suction air at the air flow rate measuring location varies substantially periodically as shown by a signal waveform $S_A$ in FIG. 13A even when the engine is operating in its steady state. In order to accurately measure the flow rate of suction air in the engine, it is necessary to average the measured values of the suction air flow rate to eliminate the factor of pulsation. In FIG. 11, the voltage $V_{BC}$ appearing across the points B and C of the bridge (the value corresponding to the suction air flow rate) is applied to an integrating circuit 104, which is commonly known per se, to obtain an output signal V representing the averaged suction air flow rate. This signal V is applied to the control unit 200 to be used for the arithmetic calculation described hereinbefore.

As is commonly known, the rotation speed of a vehicle's engine varies between, for example, about 600 γpm and about 6000 γpm, the ratio of which is about 1:10. Consequently, the frequency of pulsation of suction air shown in FIG. 13A varies at a ratio of about 1:10 corresponding to the engine rotating speed of about 600 γpm to about 6000 γpm. It is therefore desirable that the integration time constant of the integrating circuit 104 shown in FIG. 11 is variable depending on the rotation speed of the engine.

Figure 12:
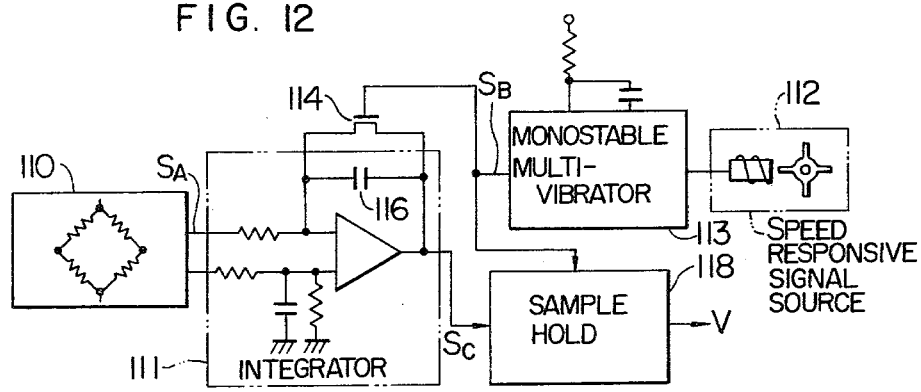
FIG. 12 is a circuit diagram of another form of the thermal type air flow meter preferably employed in the present invention.
Figure 13B:
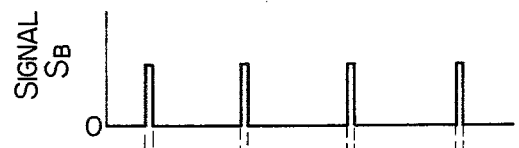
Figure 13C:
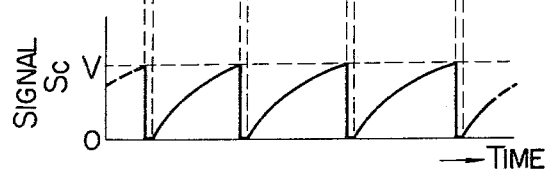

A circuit which satisfies such a requirement will be described with reference to FIG. 12 and FIGS. 13B and 13C. Referring to FIG. 12, the voltage $V_{BC}$ (Corresponding to the signal $S_A$) appearing across the Wheatstone bridge 110 is applied to an integrating circuit 111 similar to the integrating circuit 104 shown in FIG. 11. An element 112 generating an output signal synchronous with the rotation of the engine applies its output signal to a monostable multivibrator 113 which generates an output waveform $S_B$ as shown in FIG. 13B. This output $S_B$ of the multivibrator 113 is applied to the gate of a MOS switch 114. The MOS switch 114 is turned off when the output $S_B$ of the multivibrator 113 is in its low level, and the output $S_A$ of the bridge 110 is integrated by the integrating circuit 111 in a manner as shown by a waveform $S_C$ in FIG. 13C. On the other hand, the MOS switch 114 is turned on when the output $S_B$ of the multivibrator 113 is inverted into its high level. A capacitor 116 in the integrating circuit 111 is short-circuited to reset the integrating circuit 111, as seen in FIG. 13C. Thus, the output signal $S_A$ of the bridge 110 is repeatedly integrated and reset in synchronism with the rotation of the engine, and the value of V the integrated immediately before the resetting in each cycle is only derived as the suction air flow rate signal V from a sample holding circuit 118. This signal V is applied to the control unit 200 to be subjected to the arithmetic processing described hereinbefore. Such a means for deriving the averaged flow rate of suction air having the tendency of periodic pulsation is applicable not only to the thermal sensor type air flow meter but also to the differential pressure sensor type air flow meter, so that the averaged flow rate of suction air can be similarly derived.

What we claim is:
1. An air flow rate measuring apparatus for an internal combustion engine comprising:
   pressure sensor means for generating an output representative of a differential pressure ΔP which varies depending on the variation in the flow rate of suction air flowing through the main venturi of the engine, said pressure sensor means being coupled with a bypass path of the main venturi;
   thermal type air flow rate measuring means, including electrical heat-generating means located in the stream of suction air, for sensing the quantity of heat radiated into the stream of air from said heat- generating means and generating an output V corresponding to the radiated quantity of heat;

first means for arithmetically calculating the flow rate G of suction air flowing through the main venturi in accordance with the output V of said measuring means and a coefficient K varying with the lapse of time on the basis of a first predetermined algebraic function;

second means for arithmetically calculating the flow rate G of suction air flowing through the main venturi in accordance with the output ΔP of said pressure sensor means in accordance with a second predetermined algebraic function;

third means for arithmetically obtaining a calibrated coefficient K' in accordance with the flow rate G obtained by said second means and the output V of said measuring means in accordance with said first predetermined algebraic function; and fourth means for arithmetically calculating a suitable suction air flow rate G' in accordance with the calibrated coefficient K' and the output V of said measuring means in accordance with said first predetermined algebraic function.

2. An air flow rate measuring apparatus as claimed in claim 1, wherein said pressure sensor means senses the difference between the pressure of air at the inlet area of said main venturi and that at the narrowest area of said main venturi.

3. An air flow rate measuring apparatus as claimed in claim 2, wherein said pressure sensor means senses the difference between the pressure of air at the inlet area of said main venturi and that at a point downstream of the throttle valve disposed downstream of said main venturi.

4. An air flow rate measuring apparatus for an internal combustion engine comprising:

pressure sensor means for generating an output representative of a differential pressure ΔP, across two spaced predetermined points, which pressure ΔP varies depending upon the variation in the flow rate of suction air flowing through the main venturi of the engine, said pressure sensor means being coupled with a bypass path of the main venturi;

supporting means for supporting electrical heat-generating means within a predetermined air passage;

thermal type air flow rate measuring means, including electrical heat-generating means located in the stream of suction air, for sensing the quantity of heat radiated into the stream of air from said heat-generating means and generating an output V corresponding to the radiated quantity of heat;

first means for arithmetically calculating the flow rate G of suction air flowing through the main venturi in accordance with the output V of said measuring means and a coefficient K varying with the lapse of time on the basis of a first predetermined algebraic function;

second means for arithmetically calculating the flow rate G of suction air flowing through the main venturi in accordance with the output ΔP of said pressure sensor means in accordance with a second predetermined algebraic function;

third means for arithmetically obtaining a calibrated coefficient K' in accordance with the flow rate G obtained by said second means and the output V of said measuring means in accordance with said first predetermined algebraic function; and fourth means for arithmetically calculating a suitable suction air flow rate G' in accordance with the calibrated coefficient K' and the output V of said measuring means in accordance with said first predetermined algebraic function.

5. An air flow rate measuring apparatus as claimed in claim 4, wherein said two predetermined points are located in the inlet area and the narrowest area of said main venturi, and said predetermined air passage is a bypass passage formed in the body of said main venturi to communicate between said inlet area and said narrowest area of said main venturi, said electrical heat generating means being disposed within said bypass passage.

6. An air flow rate measuring apparatus as claimed in claim 4, wherein said two predetermined points are located in the inlet area of said main venturi and in an area downstream of the throttle valve disposed downstream of said main venturi, and said predetermined air passage is a bypass passage formed in the body of said main venturi to communicate between the inlet area and the narrowest area of said main venturi, said electrical heat generating means being disposed within said bypass passage.

7. An air flow rate measuring apparatus as claimed in claim 4, wherein said predetermined air passage includes a cylindrical auxiliary venturi disposed within said main venturi in substantially coaxial relation therewith, and said electrical heat generating means is disposed within said cylindrical auxiliary venturi.

8. An air flow rate measuring apparatus as claimed in claim 4, 5, 6 or 7, wherein an air temperature sensing element is disposed downstream of said electrical heat generating means.

9. An air flow rate measuring apparatus as claimed in claim 4, 5, 6 or 7, wherein said electrical heat generating means is supported by a supporting member of heat-resistive material having a cavity thereinside.

10. An air flow rate measuring apparatus as claimed in claim 4, 5, 6 or 7, wherein said supporting means comprises a planar member of heat-resistive material and a block-like member supporting the same, a slot being formed in a portion of said planar member, and said planar member is provided on its surface with a heat generator, an air temperature sensing element received partly in said slot, electrodes connecting said heat generator to a first pair of terminals provided on the remote end face of said block-like member, and electrodes connecting said air temperature sensing element to a second pair of terminals provided on the remote end of said block-like member.

11. An air flow rate measuring apparatus as claimed in claim 4, 5, 6 or 7, wherein said sensing means comprises a resistance bridge including said electrical heat generating means and an air temperature sensing element, and means for supplying electric power to said resistance bridge so that zero voltage appears across said resistance bridge.

12. An air flow rate measuring apparatus as claimed in claim 11, further comprising an integrating circuit integrating the voltage appearing across said bridge, means for generating a pulse signal synchronous with the rotation of the engine, a monostable multivibrator connected to said pulse generating means, and means for sustaining the operation of said integrating circuit during the period of time in which the output of said multivibrator is in its low level and resetting said integrating circuit when the output of said multivibrator is inverted into its high level.

* * * * *